United States Patent [19]

Mizushima et al.

[11] Patent Number: 5,020,064
[45] Date of Patent: May 28, 1991

[54] ELECTROMAGNETIC WAVE DEVICE

[75] Inventors: Yoshihiko Mizushima; Takashi Iida; Toru Hirohata; Kenichi Sugimoto; Yoshihisa Warashina; Kazutoshi Nakajima, all of Shizuoka, Japan

[73] Assignee: Hamamatsu Photonics Kabushiki Kaisha, Shizuoka, Japan

[21] Appl. No.: 393,275

[22] Filed: Aug. 14, 1989

[30] Foreign Application Priority Data

Aug. 30, 1988 [JP] Japan .................................. 63-215817

[51] Int. Cl.⁵ .............................................. H01S 3/00
[52] U.S. Cl. ...................................................... 372/37
[58] Field of Search ........................................... 372/37

[56] References Cited

U.S. PATENT DOCUMENTS 3,292,103 12/1966 Soules et al. ................................ 372/6

Primary Examiner—William L. Sikes
Assistant Examiner—Robert E. Wise
Attorney, Agent, or Firm—Finnegan, Henderson, Farabow, Garrett, and Dunner

[57] ABSTRACT

An electromagnetic wave device having an amplification function comprises a medium containing free carriers, means for applying a magnetic field to the medium, means for applying an input electromagnetic wave to the medium in a direction perpendicular to the magnetic field, and means for generating an electric field to accelerating the carriers in the direction of the input electromagnetic wave. A frequency of the input electromagnetic wave is within the range of the plasma frequency plus or minus the cyclotron frequency, and a polarization direction of the input electromagnetic wave is perpendicular both to the magnetic field and its own traveling direction. Furthermore, the device has such functions as oscillation, modulation, frequency conversion, etc. depending on the type of added units.

11 Claims, 2 Drawing Sheets

ELECTROMAGNETIC WAVE DEVICE

BACKGROUND OF THE INVENTION

The present invention relates to an electromagnetic wave device that functions as an amplifier, oscillator, etc. of electromagnetic waves, light waves, etc.

Masers and lasers are two examples of the conventional oscillators operating in the range of electromagnetic or light waves. The operating frequencies or wavelengths of these oscillators are generally fixed at the specific values that are determined by the physical phenomena they are to utilize, and hence are difficult to vary over a broad range. Ordinary transistor oscillators are capable of frequency alterations but are not suitable for use in the ultrahigh frequency range or in the region of light waves.

Devices, such as a traveling-wave tube, that utilize the plasma dispersion of electron beams feature wideband operation, but their frequency range is not so wide as to include the region of light waves. The limited frequency range occurs because the operating principles of the devices require components for signal delaying structure, but such cannot be realized in the wavelength range of light waves.

SUMMARY OF THE INVENTION

An object, therefore, of the present invention is to solve these problems of the prior art and to provide an electromagnetic wave device which can be used as an oscillator, amplifier, etc. over a very broad frequency (or wavelength) range that includes the region of ultrahigh frequencies or even the region of light waves.

This object of the present invention can be attained by an electromagnetic wave device that comprises basically a medium containing free carriers, means for applying a magnetic field to this medium, means for applying an input electromagnetic wave to said medium in a direction substantially perpendicular to said magnetic field, and means for accelerating the carriers in a direction substantially identical to the direction of the input electromagnetic wave. The frequency of the input electromagnetic wave to be applied is within the range of the plasma frequency of said medium plus or minus the cyclotron frequency, and the polarization direction of said applied electromagnetic wave is substantially perpendicular both to said magnetic field and to its own input direction.

Other and further objects, features and advantages of the invention will appear more fully from the following description taken in connection with the accompanying drawings.

DETAILED DESCRIPTION OF THE INVENTION

Figure 1:
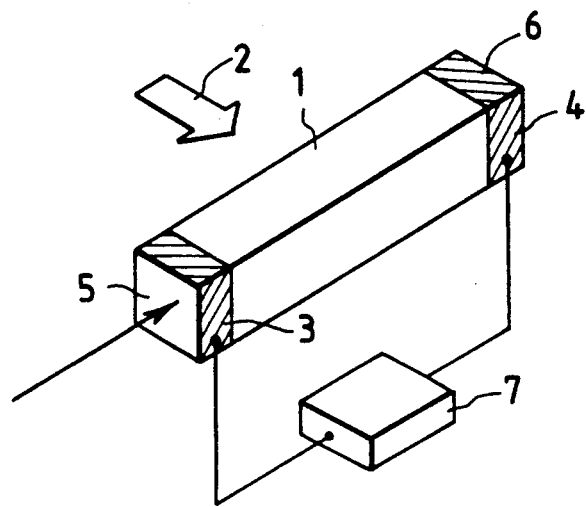
FIG. 1 is a schematic diagram showing an embodiment of the present invention which has a capability of amplifying electromagnetic waves.

The accomplishment of the present invention is based on the unique behavior of the interaction between an accelerated electron flow and plasma waves in a magnetic field. This phenomenon had not been known before it was first discovered by the present inventors. The basic operating principles of the present invention require that a negative resistance exist in a propagation mode of electromagnetic waves in crossed electric and magnetic fields.

As described above, the fundamental arrangement of the present invention is such that a medium having free carriers is placed in a static magnetic field and a carrier accelerating electric field which is perpendicular to the direction of the magnetic field, and there exists a TEM mode electromagnetic wave having its propagation vector parallel to the direction of the accelerating electric field and its polarization plane in a direction perpendicular to both the magnetic and electric fields. With this condition satisfied, the TEM mode is amplified if the frequency of an applied electromagnetic wave is close to the plasma frequency of the medium. In the absence of a magnetic field, the plasma frequency of the medium is known as a transition point at which the dielectric constant of the medium changes from positive to negative. However, in the arrangement having a magnetic field that is perpendicular to an electric field, abnormal dispersion occurs and in particular, amplification effect occurs when the electric field is accelerating as was first discovered by the present inventors.

The arrangement in which a magnetic field and an electric field are perpendicular to each other is commonly referred to as a "Voigt configuration." If the Voigt configuration has an abnormal mode, a longitudinal-wave mode can exist in applied electromagnetic waves, which hence are capable of interacting with space-charge waves. This is a fact already established in the plasma science. What the present inventors have found is that if the carriers are driven by a separate accelerating electric field, the energy of the carriers is transferred to the electromagnetic waves via the space charge and the waves can grow in amplitude.

The accelerated electron flow is modulated by the plasma and cyclotron frequencies, and produces a longitudinal space-charge wave component which interacts with the longitudinal wave that has been generated from the input electromagnetic wave in the way described above. The longitudinal wave of the electron flow thus interacts with the longitudinal wave of the input electromagnetic wave. Energy exchange occurs between the electron flow and the electromagnetic wave in such a way that the energy of the applied electric field is transferred to the electromagnetic wave when the electrons are being accelerated.

Expressed in a different way, the carriers are subjected to a cyclotron motion by a magnetic field, while at the same time, they drift under the influence of an accelerating electric field causing successive movement of the cyclotron arc. The carriers being accelerated emit electromagnetic radiation and, as a result, only a coherent mode of electromagnetic wave will grow in amplitude with respect to an external system.

In the Voigt configuration, the abnormal dispersion is determined by the plasma frequency and the cyclotron frequency. Under usual conditions where the plasma frequency is greater than the cyclotron frequency, the range of frequencies having an amplification gain may approximately be defined as the plasma frequency plus or minus the cyclotron frequency.

In order for the operating theory of the present invention to hold, it is necessary that the scattering relaxation time of carriers be adequately longer than the period of the electromagnetic waves. This condition may effectively be satisfied by a method such as cooling the medium, using a medium having large mobility or using an intense magnetic field. This consideration suggests that in the present invention the input electromagnetic waves preferably have high frequencies, particularly in the range of ultrahigh frequencies or even light waves.

Typical examples of free carriers within the medium are electron flows in a vacuum tube, as well as electrons or holes in a semiconductor. In the case of carriers in a semiconductor, electrons are usually considered because of their small effective mass and the movement of holes may usually be neglected.

FIG. 1 is a schematic diagram showing an embodiment of the present invention. In this embodiment, a medium 1 containing free carriers is an indium antimonide semiconductor measuring 5 mm = 1 mm = 1 mm and having a carrier density of $10^{18}$ cm$^{-3}$. Since the plasma frequency corresponds to a wavelength of about 17 μm, the device shown in FIG. 1 is suitable for the purpose of amplifying infrared light. The medium 1 is placed in a magnetic field 2 having a strength of 0.5 Tesla that is created by a magnetic field applying means (not shown). Placed on opposite ends of the medium 1 are electrodes 3 and 4 which are supplied with a voltage from a power source 7 to produce a carrier accelerating electric field between them. The medium 1 is positioned in such a way that the carrier accelerating electric field will cross the magnetic field 2 at right angles. Each of the electrodes 3 and 4 is shaped like a ring so that light can pass through its center. Other electrodes (not shown) are positioned in a direction perpendicular to both the magnetic field 2 and the carrier accelerating electric field and the medium 1 is supplied with a sufficient voltage to cancel the Hall voltage that accompanies carrier drift. These electrodes may be of a noncontacting type.

The amplification frequency in the first embodiment is within the far infrared region, so light having a frequency in this range is fed to the medium 1 through the window made in the electrode 3 or 4. The polarization plane of this light is selected in such a way that it crosses the magnetic field 2 at right angles. As a result of this illumination, amplified output light will be produced from the side opposite to the input side. The amplification factor is determined by subtracting the internal loss and the surface reflection from the theoretical value of approximately 30 dB per centimeter. Under a typical condition, an amplification of at least about 10 dB per centimeter is expected.

The gain frequency range may be approximated by the operating theory of the present inventors to lie between $(\omega_p^2=\omega_c^2)^{\frac{1}{2}}$ and $\frac{1}{2}\{\omega_c=(\omega_c^2=4\omega_p^2)^{\frac{1}{2}}\}$, where $\omega_p$ and $\omega_c$ are a plasma angular frequency and a cyclotron angular frequency, respectively. Elsewhere in the present invention, this gain frequency range is simply referred to as the plasma frequency plus or minus the cyclotron frequency.

In the first embodiment shown in FIG. 1, indium antimonide is used as the medium 1, but any other material may be used as long as it contains free carriers A preferred example of such alternative materials for the medium 1 is gallium arsenide. If the gallium arsenide crystal is used and if its electron density is $10^{19}$ cm$^{-3}$, the gain frequency corresponds to a wavelength of 9 μm. Indium antimonide and gallium arsenide have large carrier mobility and hence are used advantageously as the material of the medium 1. It should, however, be noted that the material of the medium 1 is by no means limited to these examples and any semiconductors, metals and semimetals may be used by taking into account the above-described limitation on the scattering relaxation time of carriers.

For instance, amplification frequencies in the ultraviolet range may be accomplished with silver or bismuth, the plasma frequency of which is within the ultraviolet region. At very low temperatures, the relaxation time of a high purity metal can be made conspicuously longer.

Electron plasma or discharge plasma in low-pressure gases may also be used as the medium 1 and in this case, one only needs to consider electrons while disregarding ions. These plasmas are generally suitable for amplification of microwaves and millimeter waves. Also usable are electron beams. Aside from the problem of the difficulty encountered in insuring the high plasma frequency, electron beams used as the medium 1 feature weaker limitation on the relaxation time because of fewer electron collisions and scattering events within the medium. For circumventing the relaxation time limitation, it is generally effective to hold the medium at low temperatures.

Figure 2:
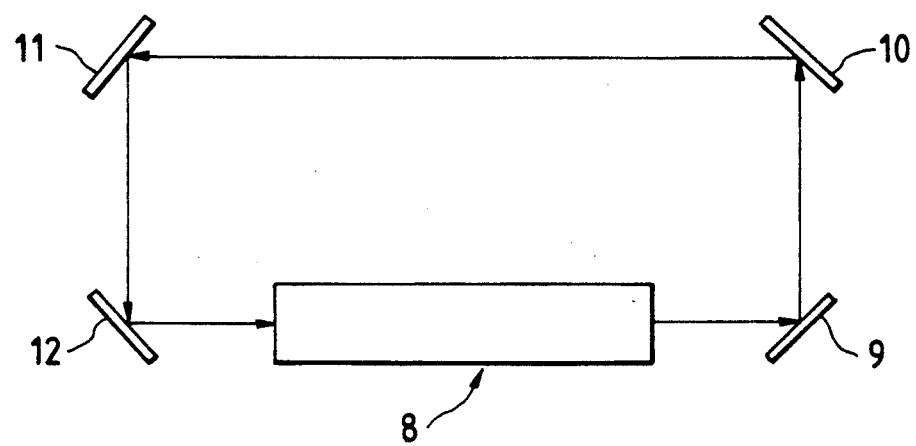
FIG. 2 is a schematic diagram showing another embodiment of the present invention which has a capability of oscillating electromagnetic waves.

A second embodiment of the present invention is described below with reference to FIG. 2. An electromagnetic wave device according to this embodiment is designed to function as an oscillator. Shown by 8 in FIG. 2 is the electromagnetic wave device depicted in FIG. 1 and the output light from this device is returned to the input side by means of resonator or reflector mirrors 9-12. The system components shown in FIG. 2 are arranged into a traveling-wave ring structure. In the absence of original input light, the system oscillates on account of its internal gain and supplies an electromagnetic wave having a frequency at the maximum gain. In changing the oscillation frequency of this oscillator, geometrical dimensions such as the distance between the resonator mirrors may be altered simultaneously.

As will be described below, the oscillation frequency can be altered by frequency modulation which may be effected by changing the plasma frequency, etc. As in the case of transistor oscillators, the oscillation frequency can be freely changed by various means of frequency modulation. Unlike lasers, the electromagnetic wave device of the present invention does not depend upon fixed particular energy levels, so one of the major features of the device is the wide gain band that can be altered.

As is apparent from the above explanation, the output electromagnetic wave from the device of the present invention can be modulated by externally modulating such a parameter as changes the frequency band, gain or internal phase shift. For example, desired output modulation can be achieved by superposing a modulating component on the applied magnetic field or accelerating electric field which were described as a dc field in the foregoing discussion.

Figure 3:
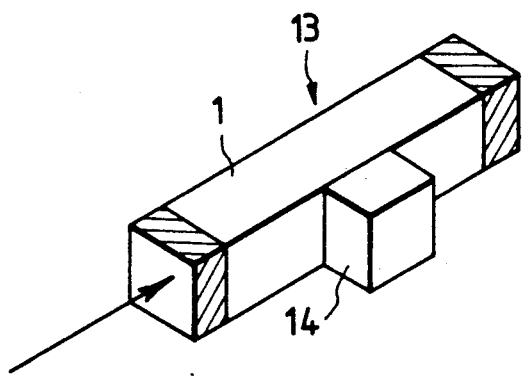
FIGS. 3 and 4 are schematic diagrams showing other embodiments of the present invention each having a capability of modulating electromagnetic waves.

As the carrier density in the device of the present invention is changed, so are the plasma frequency and the gain-frequency characteristics, thus resulting in a modulation of the output electromagnetic wave. At the same time, the equivalent optical length is altered to cause a change in the amount of phase shift, resulting in phase modulation. FIG. 3 shows an electromagnetic wave device according to another embodiment of the present invention which is furnished with means for changing the carrier density. Shown by 13 in FIG. 3 is the electromagnetic wave device depicted in FIG. 1 and shown by 14 is a semiconductor. A p-n junction is formed at a boundary between the semiconductor 14 and the medium 1 of the device 13. By applying a voltage to this p-n junction, the density of carriers in the medium 1 can be controlled.

Figure 4:
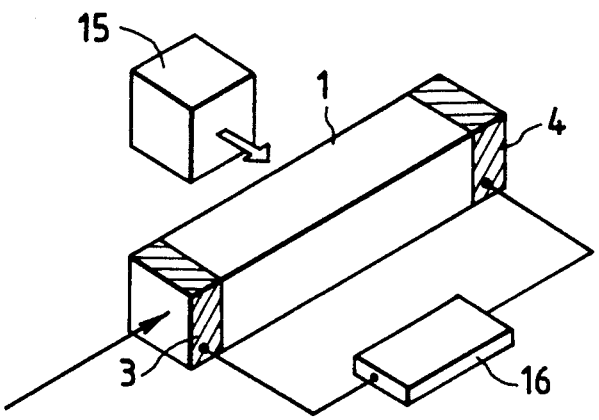

If the device of the present invention is supplied with another optical or radiation input from an external system, carriers are generated in the medium 1, causing a change in its plasma frequency and dielectric constant. This enables modulation of the electromagnetic wave being fed as an inherent input to the device. FIG. 4 shows an electromagnetic device according to a fourth embodiment of the present invention which has a capability of modulating the input electromagnetic wave by means 15 for launching light or fast moving particles into the device. An output signal is obtained in a detector 16 provided in the circuit including electrodes 3 and 4.

Figure 5:
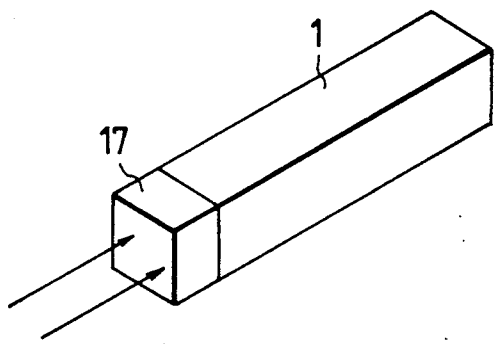
FIG. 5 is a schematic diagram showing still another embodiment of the present invention which has a capability of changing the frequency of electromagnetic waves.

The device of the present invention, whose operation depends upon the nonlinear effect of electromagnetic plasma, produces parametric effects. Therefore, in response to a plurality of input electromagnetic waves, frequency mixing is performed to produce an output which represents the sum of the two frequencies or the difference between them. FIG. 5 shows an electromagnetic wave device that makes use of this effect to provide a capability of frequency conversion. The device is supplied at the input portion 17 with electromagnetic waves having different frequencies that are produced from two input units. Since no output is produced for frequencies outside the passing band, the embodiment shown in FIG. 5 offers the advantage that a filter for rejecting those frequencies can be omitted.

Figure 6:
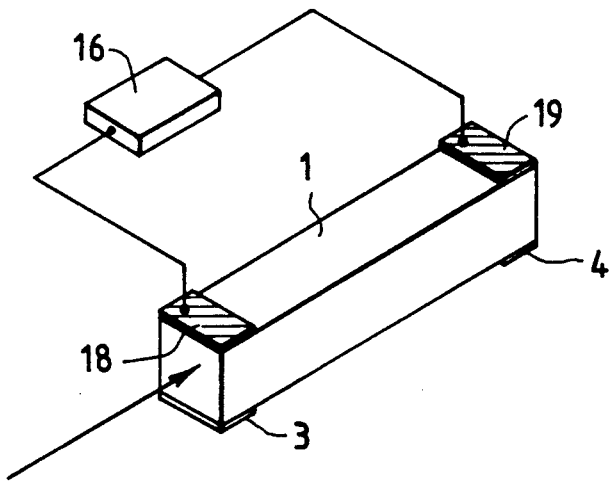
FIG. 6 is a schematic diagram showing a further embodiment of the present invention which has a capability of detecting electromagnetic waves.

In the device of the present invention, the electric and magnetic fields involved are mixed up as a whole, so an input electromagnetic wave will produce a reaction which develops at a control electrode. In other words, an electromotive force or a current will develop in the direction of carrier drift, thus enabling the device to operate as an electromagnetic wave detector. FIG. 6 shows an electromagnetic wave device according to a further embodiment of the present invention which has a capability of detecting electromagnetic waves. Shown by 18 and 19 are electrodes that are integral with or independent from the accelerating electrodes 3 and 4 and are combined with a detector 16 to make up means for detecting the electromotive force or current that is generated in the direction of carrier drift.

Another potential use of the device of the present invention is as a frequency analyzer. If the device is provided with frequency selecting characteristics by either adding a frequency filter such as a resonator to the external circuit or by adjusting various parameters as exemplified above, a series of frequency-analyzed outputs of electromagnetic waves can be obtained by successively changing the characteristics on a time basis.

As described on the foregoing pages, the electromagnetic device of the present invention consists basically of an amplifier, with a few functional units being added to furnish the device with the ability to work as an oscillator, modulator, frequency converter, detector, etc. depending on the type of added units. The electromagnetic waves to be handled by the present invention are within the region determined by the plasma frequency, so it may be operated over the entire range defined by the plasma frequency including not only the region of ordinary electric waves but also the region of light waves or even X-rays. Thus, the device of the present invention is a unique device available today in that tuning frequencies cover a broad range and that it has the potential to be commercialized as a laser whose operating frequency is in the lightwave region. The device of the invention has the great value in its industrial application.

What is claimed is:

1. An electromagnetic wave device, comprising:
   a medium carrying free carriers, said medium having a plasma frequency and a cyclotron frequency;
   means for applying a magnetic field to said medium;
   means for applying a first input electromagnetic wave having a first frequency to said medium in a direction substantially perpendicular to said magnetic field; and
   means for accelerating said carriers in a direction substantially identical to the direction of said first input electromagnetic wave; wherein
   a frequency of said first input electromagnetic wave is within a range defined by the plasma frequency of said medium plus or minus the cyclotron frequency of said medium, and
   a polarization direction of said input electromagnetic wave is substantially perpendicular both to said magnetic field and the direction of said first input electromagnetic wave; whereby
   said device has a function of amplifying said first input electromagnetic wave.

2. An electromagnetic wave device as claimed in claim 1, further comprising means combined with said medium for selecting a specific wavelength, thereby providing an additional function of oscillating an electromagnetic wave.

3. An electromagnetic wave device as claimed in claim 1, further comprising means for returning at least a portion of an output electromagnetic wave to an input side of said device, thereby providing an additional function of oscillating an electromagnetic wave.

4. An electromagnetic wave device as claimed in claim 1, further comprising means for varying a density of said carriers to provide an additional function of modulating said first input electromagnetic wave.

5. An electromagnetic wave device as claimed in claim 4, wherein said carrier density varying means comprises a p-n junction formed on said medium, and said density of said carriers is controlled by a voltage applied to said p-n junction.

6. An electromagnetic wave device as claimed in claim 1, further comprising means for varying said magnetic field to provide an additional function of modulating said first input electromagnetic wave.

7. An electromagnetic wave device as claimed in claim 1, further comprising means for varying an electric field of said carrier accelerating means to provide an additional function of modulating said first input electromagnetic wave.

8. An electromagnetic wave device as claimed in claim 1, further comprising means for launching a modulating signal to modulate said first input electromagnetic wave.

9. An electromagnetic wave device as claimed in claim 1, further comprising:
    means for applying a second input electromagnetic wave having a second frequency to said medium; and
    means for extracting an output electromagnetic wave having a heterodyned third frequency; whereby said device has an additional function of performing frequency conversion.

10. An electromagnetic wave device as claimed in claim 1, further comprising means for detecting a variation of an electromotive force in the direction of said first input electromagnetic wave, thereby providing an additional function of detecting said first input electromagnetic wave.

11. An electromagnetic wave device as claimed in claim 1, further comprising means for detecting a variation of an electric current in the direction of said first input electromagnetic wave, thereby providing an additional function of detecting said first input electromagnetic wave.

* * * * *